(12) United States Patent
Sakai et al.

(10) Patent No.: US 11,949,581 B2
(45) Date of Patent: Apr. 2, 2024

(54) INFORMATION PROCESSING APPARATUS, INFORMATION PROCESSING METHOD, AND NON-TRANSITORY STORAGE MEDIUM

(71) Applicant: KABUSHIKI KAISHA TOSHIBA, Tokyo (JP)

(72) Inventors: Yumiko Sakai, Fujisawa Kanagawa (JP); Tomonori Maegawa, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 238 days.

(21) Appl. No.: 17/446,112

(22) Filed: Aug. 26, 2021

(65) Prior Publication Data

US 2022/0182307 A1  Jun. 9, 2022

(30) Foreign Application Priority Data

Dec. 9, 2020 (JP) .................................. 2020-204338

(51) Int. Cl.
*H04L 43/50* (2022.01)
*H04L 43/10* (2022.01)
*H04L 43/18* (2022.01)

(52) U.S. Cl.
CPC .............. *H04L 43/50* (2013.01); *H04L 43/10* (2013.01); *H04L 43/18* (2013.01)

(58) Field of Classification Search
CPC .......... H04L 43/10; H04L 43/18; H04L 43/50
USPC ........................................................ 370/252
See application file for complete search history.

(56) References Cited

U.S. PATENT DOCUMENTS

| 9,824,000 B1 | 11/2017 | Babcock |
| 10,355,953 B2 | 7/2019 | Mueller |
| 2004/0146007 A1* | 7/2004 | Saadawi ................. H04L 45/08 370/252 |

(Continued)

FOREIGN PATENT DOCUMENTS

| JP | 2012-156853 A | 8/2012 |
| JP | 2017-525291 A | 8/2017 |
| JP | 2020-191498 A | 11/2020 |

OTHER PUBLICATIONS

Apache JMeter™ GitHub ReadMe (https://github.com/apache/jmeter) 8 pages.
Apache JMeter™ Overview (https://jmeter.apache.org/) 1 page.

*Primary Examiner* — James E Springer
(74) *Attorney, Agent, or Firm* — Finnegan, Henderson, Farabow, Garrett & Dunner, LLP

(57) ABSTRACT

According to one embodiment of the present invention, a device and the like that increases reliability and efficiency of a test on a device configured to perform processing based on received data are provided. An information processing apparatus corresponding to one embodiment of the present invention includes a receiver, an analyzer, a generator, and a transmitter. The receiver is configured to receive data transmitted from a first apparatus and addressed to a second apparatus. The analyzer is configured to perform an analysis on the data that is received. The generator is configured to generate test communication data corresponding to the data that is received based on a result of the analysis. The transmitter is configured to transmit the test communication data to the second apparatus with a transmission source of the test communication data spoofed as the first apparatus.

13 Claims, 8 Drawing Sheets

(56) References Cited

U.S. PATENT DOCUMENTS

| | | |
|---|---|---|
| 2006/0041415 A1 | 2/2006 | Dybas et al. |
| 2008/0320154 A1* | 12/2008 | Demmer ................. H04L 43/12 |
| | | 709/229 |
| 2017/0026162 A1* | 1/2017 | Nabetani ............... H04L 1/1854 |
| 2020/0368076 A1* | 11/2020 | Knittle ............. A61F 13/15747 |

* cited by examiner

FIG. 3A

| TRANSMISSION TIME | TRANSMISSION SOURCE | TRANSMISSION DESTINATION | PAYLOAD |
|---|---|---|---|
| 09:00:05.158 | 10.0.0.1 | 10.0.1.1 | [{"device_id":"001","time":"09:00:00","data":"1.9"},{"device_id":"002","time":"08:59:59","data":"1.5"}] |
| 09:00:15.234 | 10.0.0.1 | 10.0.2.1 | {"frontend":"4"} |
| 09:01:05.164 | 10.0.0.1 | 10.0.1.1 | [{"device_id":"001","time":"09:01:00","data":"1.5"},{"device_id":"002","time":"09:00:59","data":"1.5"}] |
| 09:01:35.483 | 10.0.0.1 | 10.0.1.5 | {"email":"email.com","name":"name","lang":"ja","tags":["type","maintainer"]} |
| 09:02:05.170 | 10.0.0.1 | 10.0.1.1 | [{"device_id":"001","time":"09:02:00","data":"1.8"},{"device_id":"002","time":"09:01:59","data":"1.1"}] |
| 09:02:05.965 | 10.0.0.1 | 10.0.2.2 | {"password":"pass"} |
| : | : | : | : |

FIG. 3B

| TRANSMISSION TIME | TRANSMISSION SOURCE | TRANSMISSION DESTINATION | PAYLOAD |
|---|---|---|---|
| 09:00:05.158 | 10.0.0.1 | 10.0.1.1 | [{"device_id":"001","time":"09:00:00","data":"1.9"},{"device_id":"002","time":"08:59:59","data":"1.5"}] |
| 09:01:05.164 | 10.0.0.1 | 10.0.1.1 | [{"device_id":"001","time":"09:01:00","data":"1.5"},{"device_id":"002","time":"09:00:59","data":"1.5"}] |
| 09:02:05.170 | 10.0.0.1 | 10.0.1.1 | [{"device_id":"001","time":"09:02:00","data":"1.8"},{"device_id":"002","time":"09:01:59","data":"1.1"}] |
| : | : | : | : |

FIG. 3C

| TRANSMISSION TIME | TRANSMISSION SOURCE | TRANSMISSION DESTINATION | PAYLOAD |
|---|---|---|---|
| 00:00:00.000 | 10.0.0.1 | 10.0.1.1 | [{"device_id":"001","time":"-00:00:05","data":"1.9"},{"device_id":"002","time":"-00:00:06","data":"1.5"}] |
| 00:01:00.006 | 10.0.0.1 | 10.0.1.1 | [{"device_id":"001","time":"-00:00:05","data":"1.5"},{"device_id":"002","time":"-00:00:06","data":"1.5"}] |
| 00:01:00.006 | 10.0.0.1 | 10.0.1.1 | [{"device_id":"001","time":"-00:00:05","data":"1.8"},{"device_id":"002","time":"-00:00:06","data":"1.1"}] |
| : | : | : | : |

FIG. 3D

| TRANSMISSION TIME | TRANSMISSION SOURCE | TRANSMISSION DESTINATION | PAYLOAD |
|---|---|---|---|
| 11:00:17.169 | 10.0.0.1 | 10.0.1.1 | [{"device_id":"001","time":"11:00:12","data":"1.9"},{"device_id":"002","time":"11:00:11","data":"1.5"}] |
| 11:01:17.175 | 10.0.0.1 | 10.0.1.1 | [{"device_id":"001","time":"11:01:12","data":"1.5"},{"device_id":"002","time":"11:01:11","data":"1.5"}] |
| 11:02:17.181 | 10.0.0.1 | 10.0.1.1 | [{"device_id":"001","time":"11:02:12","data":"1.8"},{"device_id":"002","time":"11:02:11","data":"1.1"}] |
| : | : | : | : |

| MODEL | TRANSMISSION INTERVAL | TRANSMISSION INTERVAL OUTLIER RATE | LABEL | MEASUREMENT TIME | MEASUREMENT VALUE UPPER LIMIT | MEASUREMENT VALUE LOWER LIMIT | MEASUREMENT VALUE OUTLIER RATE | ARRAY |
|---|---|---|---|---|---|---|---|---|
| MODEL A | 00:01:00 | 0.001% | integer | -00:00:05 | 1.9 | 1.1 | 0.01% | True |
| MODEL B | 00:05:00 | 0.01% | string | -00:00:10 | 9.2 | -9.8 | 5% | False |
| MODEL C | 00:00:10 | 0.03% | char | -00:00:01 | 1019 | 3 | 0.3% | True |
| .. | .. | .. | .. | .. | .. | .. | .. | .. |

FIG. 5

INFORMATION PROCESSING APPARATUS, INFORMATION PROCESSING METHOD, AND NON-TRANSITORY STORAGE MEDIUM

CROSS-REFERENCE TO RELATED APPLICATION(S)

This application is based upon and claims the benefit of priority from Japanese Patent Application No. 2020-204338, filed Dec. 9, 2020; the entire contents of which are incorporated herein by reference.

FIELD

Embodiments described herein relate generally to an information processing apparatus, an information processing method, and a non-transitory storage medium.

BACKGROUND

In recent years, along with development in an internet of things (IoT) field, a large amount of various data can be collected, and use of the collected data has attracted attention. For example, a service for detecting an abnormality based on a distribution of the collected data or the like has been operated. In addition, a service for predicting a future variation, such as a traffic jam, a weather, or a corporate stock, based on the collected data has been operated.

To improve reliability of the above-described services, it is vital that a test is to be sufficiently performed. However, it is difficult to sufficiently prepare data for the test. For example, when a service for monitoring expensive industrial devices is to be started, purchase of a large number of the industrial devices for development to obtain data of the industrial devices is not realistic in terms of costs. In addition, when the industrial devices are not distributed in a large quantity, there is not a lot of chances to obtain the data of the industrial devices.

For this reason, instead of using actual data as the data for the test, data generated in a simulative manner is also used as the data for the test. In addition, instead of reading the data for the test, the test is also performed by generating an error in a simulative manner in a program for realizing the service.

However, according to these methods, since a user is to create a scenario for generating the data for the test or specify a type or a frequency of the error to be generated, a burden of the user is large. In addition, a situation has happened that, a reproduction test is performed since an error has occurred in the service, but the error does not occur in the reproduction test, which troubles an operator of the service. In many cases, this is not due to a difference in content between the data for the test and the actual data, but there is an issue in a communication environment, processing timing, or the like. Therefore, even when the data for the test is prepared with difficulty, reliability of the test may not necessarily be improved.

BRIEF DESCRIPTION OF THE DRAWINGS

FIGS. 3A to 3D are diagrams for describing processing on received communication data;

FIG. 5 is a diagram illustrating an analysis result;

DETAILED DESCRIPTION

According to one embodiment of the present invention, an apparatus and the like that increases reliability and efficiency of a test on an apparatus configured to perform processing based on received data are provided.

An information processing apparatus corresponding to one embodiment of the present invention includes a receiver, an analyzer, a generator, and a transmitter. The receiver is configured to receive data transmitted from a first apparatus and addressed to a second apparatus. The analyzer is configured to perform an analysis on the data that is received. The generator is configured to generate test communication data corresponding to the data that is received based on a result of the analysis. The transmitter is configured to transmit the test communication data to the second apparatus with a transmission source of the test communication data spoofed as the first apparatus.

An embodiment will be explained in detail below with reference to the accompanying drawings. The present invention is not limited to the embodiment. (One embodiment of the present invention)

Figure 1:
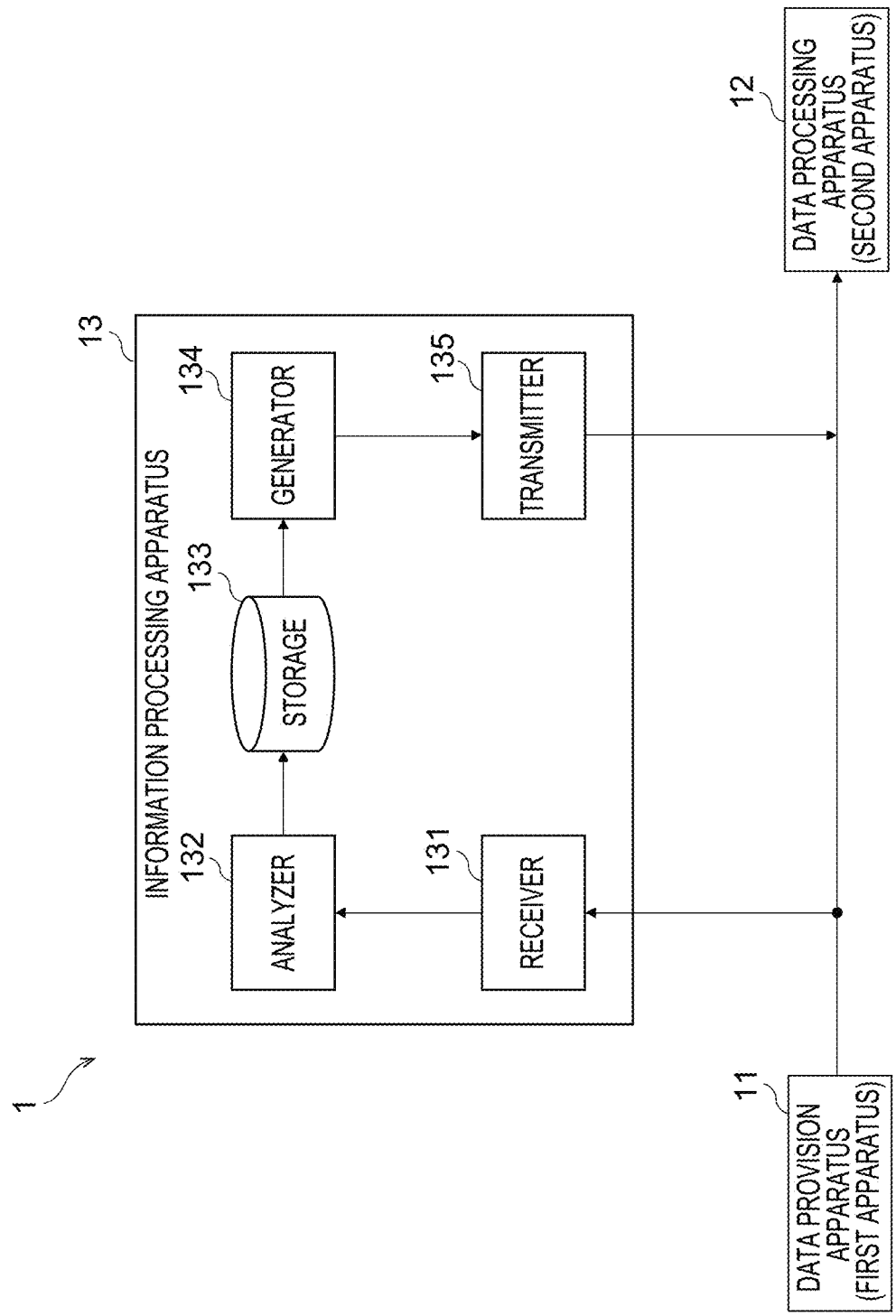
FIG. 1 is a block diagram illustrating an information processing system according to one embodiment of the present invention.

FIG. 1 is a block diagram illustrating an information processing system according to one embodiment of the present invention. An information processing system 1 according to the present embodiment includes a data provision apparatus (first apparatus) 11, a data processing apparatus (second apparatus) 12, and an information processing apparatus 13. The information processing apparatus 13 includes a receiver 131, an analyzer 132, a storage 133, a generator 134, and a transmitter 135.

The information processing system 1 is a system in which the data processing apparatus 12 performs predetermined processing based on data provided from the data provision apparatus 11. The processing is not particularly limited. For example, a determination as to whether the data provision apparatus 11 is in a normal or abnormal state may be performed based on the data provided from the data provision apparatus 11. Alternatively, an estimation of a future value of the data or data associated with the data may be performed. In addition, the data processing apparatus 12 may return, or may not return, a processing result to the data provision apparatus 11.

The data provided by the data provision apparatus 11 may be related to the data provision apparatus 11. For example, the data may indicate a load, values of an input and an output, or the like of the data provision apparatus 11. Alternatively, the data provision apparatus 11 may be an apparatus for monitoring, and the data provided by the data provision apparatus 11 may be related to a monitor target. For example, the data may be information measured by a sensor included in the data provision apparatus 11 such as information related to an environment. For example, the information may be a temperature, a humidity, or a wind speed. Alternatively, the data may be information related to an object captured by a camera included in the data provision apparatus 11 such as, for example, a location, a color, or a movement speed.

It is noted that the data provided by the data provision apparatus 11 may not necessarily be configured by an actually measured value. For example, the data may include a value estimated by the data provision apparatus 11, or may also include a predetermined value for the test.

It is noted that the data provision apparatus 11 may include a plurality of data provision apparatuses 11. For example, in some cases, the monitor target may be monitored using a plurality of IoT terminals, and pieces of data respectively obtained by the plurality of IoT terminals may be transmitted to the data processing apparatus 12. As will be mentioned below, even in such a case, the processing of the present embodiment is not affected.

It is noted that the data provided from the data provision apparatus 11 is transmitted to the data processing apparatus 12 via a communication network. For this, the data provision apparatus 11 converts data to be provided in a format in compliance with a communication protocol and transmits the data. Although terms of the data in the format may be different, such as a packet, a frame, and the like, depending on a communication layer, but the data is not distinguished in the present description and will be referred to as "communication data". Furthermore, the data provided from the data provision apparatus 11 will be referred to as "actual data", and the communication data including the actual data will be referred to as "actual communication data".

That is, the actual communication data transmitted from the data provision apparatus 11 and addressed to the data processing apparatus 12 (transmission destination) is included in the communication data flowing in the communication network between the data provision apparatus 11 and the data processing apparatus 12, and the actual communication data includes therein the actual data.

In addition, the information processing system 1 performs a test for the data processing apparatus 12. The information processing apparatus 13 is an apparatus for performing the test.

The information processing apparatus 13 receives the actual communication data, and generates communication data for the test based on the actual communication data. The communication data for the test includes data for the test corresponding to the actual data. Hereinafter, the communication data for the test will be referred to as "test communication data", and the data for the test will be referred to as "test data". A detail of the generation of the test communication data will be described below together with components of the information processing apparatus 13.

It is noted that an address of the actual communication data is the data processing apparatus 12, and is not the information processing apparatus 13. Therefore, the information processing apparatus 13 is to intercept the actual communication data, but a technology in a related art may be used for the interception.

For example, when the data provision apparatus 11 and the information processing apparatus 13 exist in a same local area network (LAN), the information processing apparatus 13 can receive a frame relevant to the actual communication data from the data provision apparatus 11. Normally, the frame that is not addressed to itself is discarded. However, the information processing apparatus 13 can receive the actual communication data when a check is performed on whether or not the address is the data processing apparatus 12 using information (for example, an IP address) indicating the address included in the received frame or the like, and a setting is made such that the frame addressed to the data processing apparatus 12 is not to be discarded. In addition, when the data processing apparatus 12 and the information processing apparatus 13 exist in a same LAN, the information processing apparatus 13 can receive a copy of the frame that is generated by communication equipment such as a switch in the identical LAN and that is to be received by the data processing apparatus 12. Therefore, in this case too, when the setting is made such that the frame addressed to the data processing apparatus 12 is not to be discarded, the information processing apparatus 13 can receive the actual communication data. In addition, in a case where the information processing apparatus 13 exist in neither the same LAN as the data provision apparatus 11 nor the same LAN as the data processing apparatus 12, when communication equipment such as a router existing on a communication route from the data provision apparatus 11 to the data processing apparatus 12 is set to forward the packet addressed to the data processing apparatus 12 to the information processing apparatus 13, the information processing apparatus 13 can receive the actual communication data in the packet.

At the time of the test, the information processing apparatus 13 generates and transmits the test communication data to the data processing apparatus 12. The data processing apparatus 12 processes the test communication data from the information processing apparatus 13 without distinguishing the test communication data from the actual communication data. In this manner, it is possible to execute the test based on the test communication data.

Figure 2:
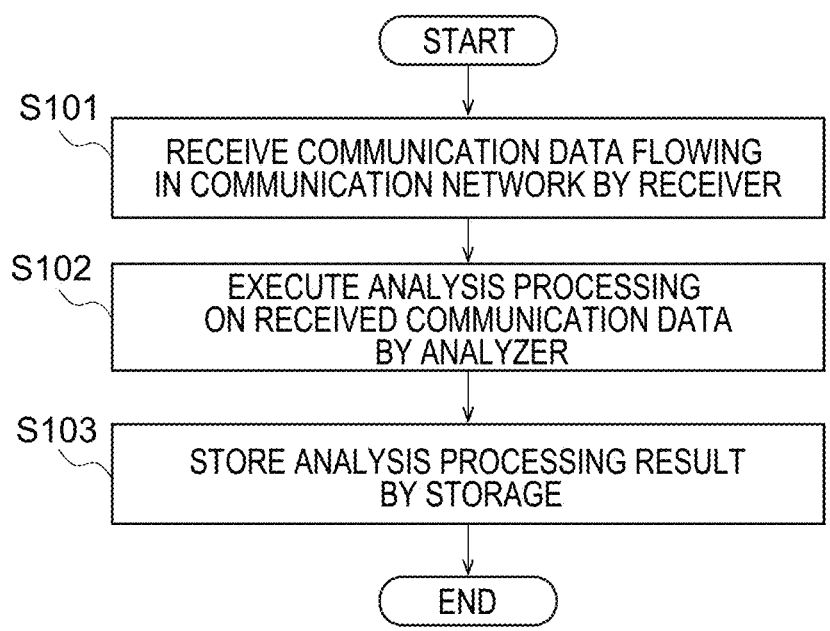
FIG. 2 is an overview flowchart of processing for preparing a test.

The components of the information processing apparatus 13 and a detail of the processing will be described along its flow. FIG. 2 is an overview flowchart of processing for preparing the test.

The receiver 131 of the information processing apparatus 13 receives the communication data flowing in the communication network (S101). It is noted that, the receiver 131 can perhaps only the actual communication data due to the forwarding by the communication equipment in some cases, but it perhaps receives the communication data addressed to the data processing apparatus 12 from different unit from the data provision apparatus 11 in other cases. In addition, even the communication data addressed to the data processing apparatus 12 from the data provision apparatus 11 may not necessarily be the actual communication data, and may be data that is not related to the processing of the data processing apparatus 12 set as a target. Therefore, the analyzer 132 of the information processing apparatus 13 executes analysis processing on the communication data received by the receiver 131 (S102), and obtains information required for the generation of the test communication data.

FIGS. 3A to 3D are diagrams for describing processing on the received communication data. FIG. 3A illustrates the communication data received by the receiver 131. Each of rows in a table of FIG. 3A corresponds to one piece of communication data. In an example of FIG. 3A, the received communication data includes a transmission time at which the communication data is transmitted, an IP address indicating a transmission source, an IP address indicating a transmission destination, and a payload. The payload refers to a data body obtained by excluding additional information such as a header from the communication data. Therefore, the payload of the actual communication data is equivalent to the actual data.

It is noted that an IP address of the data provision apparatus 11 is set as "10.0.0.1", and an IP address of the data processing apparatus 12 is set as "10.0.1.1". Therefore, the first, third, and fifth rows in the table of FIG. 3A are relevant to the actual communication data, and the other rows are not relevant to the actual communication data. In this manner, when the communication data that is not the actual communication data is also received, the analyzer 132 extracts communication related to the actual communication data based on the IP addresses of the data provision apparatus 11 and the data processing apparatus 12 as one example of the analysis processing. FIG. 3B illustrates the actual communication data extracted by the analyzer 132. It is noted that the extraction may be performed based on a value of data included in the payload instead of the IP addresses.

A payload in the first row in FIG. 3B indicates data of {"device_id":"001","time":"09:00:00","data":"1.9"}. This indicates that a value of a collection target item in a device having a "device_id" of "001" is "1.9", and a measurement time of this value is at "09:00:00". This value is used for the processing of the data processing apparatus 12. In this manner, the payload of the actual communication data includes the value used in the processing of the data processing apparatus 12 and the time at which this value is obtained by the data provision apparatus 11. It is noted that the device may mean the data provision apparatus 11 or may mean a part of instrument of the data provision apparatus 11 or the like.

It is noted that the payload may include other information such as, for example, information indicating a type of a sensor used for the measurement. In addition, one piece of actual communication data may include a plurality of values. For example, the data provision apparatus 11 may collectively transmit measurement values for several times to the data processing apparatus 12 at once. In addition, a plurality of data provision apparatuses 11 may exist, and one of them may be a representative of the data provision apparatuses 11 to collect values of the respective data provision apparatuses 11 and collectively transmit the values to the data processing apparatus 12. Therefore, the measurement values for several times for each of the plurality of data provision apparatuses 11 may be included in one payload.

The analyzer 132 may further process the actual communication data for the creation of the test communication data. FIG. 3C is a diagram illustrating a process example. In the example of FIG. 3C, the transmission time is processed. The transmission time in the first row is set as a reference time of "00:00:00.000", and the transmission time in a row other than the first row indicates a difference from the transmission time in the preceding row, in other words, a transmission interval. In addition, a value related to the time in the payload is changed into a value indicating the difference from the transmission time. When such a process is performed, at the time of the generation of the test communication data, these values can be easily changed into values in accordance with the execution time of the test. The processed actual communication data illustrated in FIG. 3C may be also regarded as a template of the test communication data. The analyzer 132 may detect and change an item specified in advance in this manner such as the time from the actual communication data as one example of the analysis processing.

It is noted that the time in the payload of FIG. 3C is a negative figure while the transmission time in the identical row is set as a reference. This is because the time in the payload is a time at which the value in the payload is obtained by the data provision apparatus 11 or the like, and is a time before the transmission time of the actual communication data by the data provision apparatus 11.

The storage 133 stores a processing result of the analyzer 132 as illustrated in FIGS. 3B and 3C (S103). It is noted that data to be stored in the storage 133 is not particularly limited. For example, a set value or the like related to the test which is specified in advance by an administrator or the like of the test may be stored. For example, when the test is automatically executed, a start time of the test may be stored.

Figure 4:
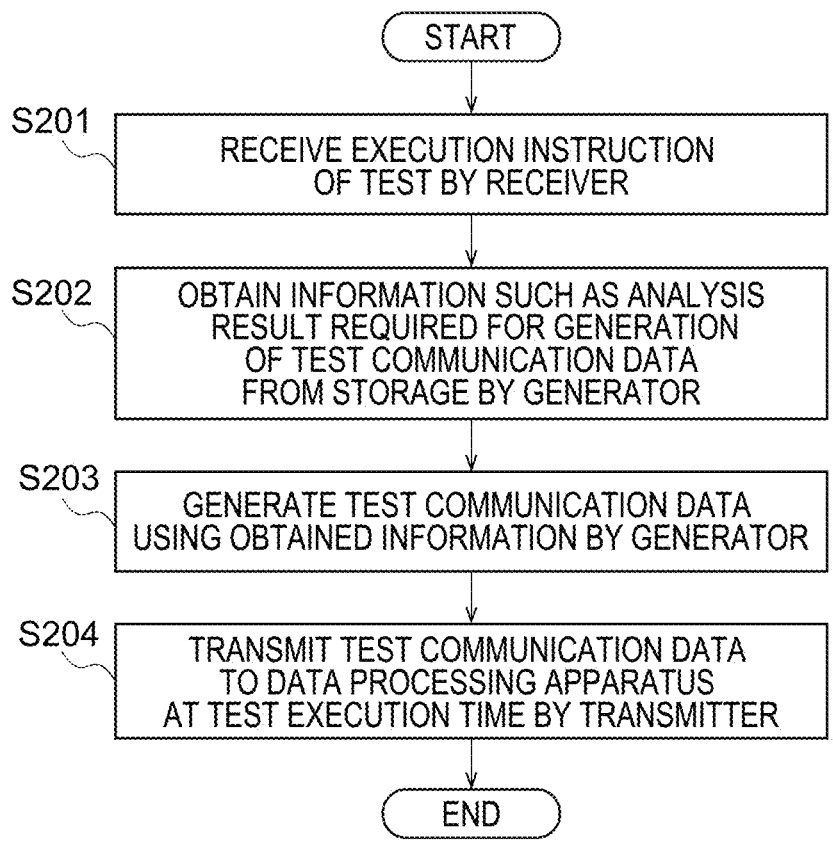
FIG. 4 is an overview flowchart of processing for the test.

In this manner, after the preparation for the test is in order, the test is executed. FIG. 4 is an overview flowchart of processing for the test.

The receiver 131 receives an execution instruction of the test together with the information required for the execution of the test such as the execution time of the test (S201). It is noted that in a case where the test is regularly and automatically performed or the like, the processing in S201 is skipped. In addition, it is sufficient that the information required for the execution of the test is stored in the storage 133 in advance. The generator 134 obtains information required for the generation of the test communication data from the storage 133 (S202). Then, the test communication data is generated using the obtained information (S203). For example, the template illustrated in FIG. 3C is obtained to set the transmission time, the time in the payload, or the like. In this case, the test communication data may be regarded as data in which a value such as a time included in the actual communication data is disguised.

FIG. 3D illustrates the generated test communication data. Each of rows is equivalent to one piece of the test communication data. In an example of FIG. 3D, the transmission time of the test communication data indicates a time obtained by adding a predetermined time to the transmission time of the template illustrated in FIG. 3C. The predetermined time is specified in accordance with the test. For example, the predetermined time may be a start time of the test.

Since the transmission time of the template in the first row of FIG. 3C is "00:00:00.000" and the transmission time of the test communication data in the first row of FIG. 3D is "11:00:17.169", it is understood that "11:00:17.169" is added. Since the transmission time of the template in the second row of FIG. 3C is "00:01:00.006", "11:01:17.175" obtained by adding "11:00:17.169" to "00:01:00.006" is the transmission time of the test communication data in the second row of FIG. 3D. Although the transmission time of the template in the third row of FIG. 3C is also "00:01:00.006", as described above, this transmission time is the difference from the preceding row. Therefore, "11:02:17.181" obtained by adding the transmission time "11:01:17.175" in the second row of FIG. 3D to "00:01:00.006" is the transmission time of the test communication data in the third row of FIG. 3D.

It is noted that the test communication data of FIG. 3D may be directly generated from the actual communication data of FIG. 3B. The time difference from "09:00:05.158" to "11:00:17.169" may be added to each of the times of FIG. 3B. In other words, the process as illustrated in FIG. 3C may not be necessarily performed.

The transmitter 135 of the information processing apparatus 13 transmits the generated test communication data to the data processing apparatus 12 based on the transmission time included in the test communication data (S204). At this time, the transmitter 135 preferably performs the transmission with a transmission source of the test communication data spoofed as the data provision apparatus using a technology such as IP spoofing. Alternatively, the test data may include an item related to the transmission source, and by setting information indicating the data provision apparatus 11 instead of the information processing apparatus 13 in the item, software configured to perform the processing of the data processing apparatus 12 may misunderstand that the data is from the data provision apparatus 11.

In addition, the transmitter 135 may perform the transmission at the transmission time included in the test communication data, for example, or may perform the transmission after a predetermined period of time elapses since the transmission time included in the test communication data. Thus, the test based on the test communication data for the data processing apparatus 12 is executed.

It is noted that the test may be performed using one piece of test communication data, but the test is preferably performed by sequentially transmitting plural pieces of test communication data because reproducibility of the error is improved. In the example of FIG. 3D, three pieces of test communication data are illustrated, and the transmission time of each piece of the test communication data is set. In such a case, the transmitter 135 preferably transmits each piece of the test communication data at a same interval as an interval for the transmission time of each piece of the test communication data. For example, when the test communication data in the first row of FIG. 3D is transmitted at "11:00:18.169" that is one second after the transmission time "11:00:17.169", the test communication data in the second row of FIG. 3D is also similarly transmitted at "11:01:18.175" that is one second after the transmission time "11:01:17.175". In this manner, when the transmission is performed without changing the transmission interval for each piece of the test communication data, the data provision apparatus receives the test communication data in the same manner as the actual communication data. Therefore, the test is more preferably performed using the plural pieces of test communication data at the same transmission interval as that of the actual communication data as described above than the test based on the one piece of test communication data because a difference from the actual processing of the data processing apparatus 12 is decreased.

It is noted that the above-described flow is one example, and in addition to the above, various types of processing may be performed. For example, in the above description, values other than the time in the payload are not changed. Therefore, the actual data and the test data are not different with regard to the data used by the data processing apparatus. However, there may be a desire to perform the test by changing the transmission interval. In view of the above, the analyzer 132 may collect statistics of transmission intervals of the actual communication data, and the generator 134 may determine the transmission times of the test communication data based on a statistical result as one example of the analysis processing. In addition, the analyzer 132 may calculate an average of the transmission intervals of the actual communication data and a probability of an occurrence of an event where the transmission is performed at a time off the average by a predetermined period of time or more as one example of the analysis processing. In addition, a distribution of the probability may be normalized by a normal distribution, a Poisson distribution, or the like. In addition, an outlier, in other words, a transmission interval when the transmission is performed at a time off the average by the predetermined period of time or more may be determined using Grubbs's test or the like. The generator 134 may transmit the test communication data at a transmission interval different from that of the actual data using such an analysis result. In addition, similarly, the analyzer 132 may collect statistics of measurement times and measurement values, and the generator 134 may determine these values based on a statistical result and set the values in the new test communication data.

FIG. 5 is a diagram illustrating an example of the analysis result. In the example of FIG. 5, a case is illustrated where a plurality of models are registered as the data provision apparatuses. In addition, each of rows indicates a result of statistics of the actual communication data for each of the data provision apparatuses. The generator 134 may generate a value of the test data based on such a statistical result. For example, test communication data related to a model A may be transmitted with a delay of approximately five seconds from the measurement time indicated by the test data, and the test communication data may be transmitted without a delay longer than five seconds or with a delay longer than five seconds from the measurement time at a rate of 0.001%.

It is noted that the analysis result as illustrated in FIG. 5 may be obtained from data other than the actual communication data. For example, a manufacturer or the like of the data provision apparatus 11 may provide information such as a transmission interval or a data format. In addition, there may be a case where statistical data of a same model as the data provision apparatus 11 can be obtained in advance. In such a case, already identified information may be stored in the storage 133 in advance, and the analyzer may perform statistical processing with regard to an item that is not identified. In addition, the generator 134 may regard the data provided by the manufacturer or the like of the data provision apparatus 11 as normal and regard the statistical result based on the actual communication data as semi-normal to generate normal test communication data and semi-normal test communication data. In this manner, the normal test based on the normal test communication data and the semi-normal test based on the semi-normal test communication data may be executed.

In addition, timing at which the transmitter 135 transmits the test communication data is preferably adjusted. For example, transmission timing is preferably changed by taking into account a period of the transmission from the data provision apparatus 11 to the data processing apparatus 12 and a period of the transmission from the information processing apparatus 13 to the data processing apparatus 12.

It is sufficient that the information processing apparatus 13 exists in a location where the actual communication data can be received. The information processing apparatus 13 can exist in the same LAN as the data provision apparatus 11, exist in the same LAN as the data processing apparatus 12, and exist in a communication network different from those of the data provision apparatus 11 and the data processing apparatus 12. However, a period of time for the test communication data to reach the data processing apparatus 12 from the information processing apparatus 13 varies depending on the location of the information processing apparatus 13. Therefore, the period of time is also preferably taken into account.

Figure 6:
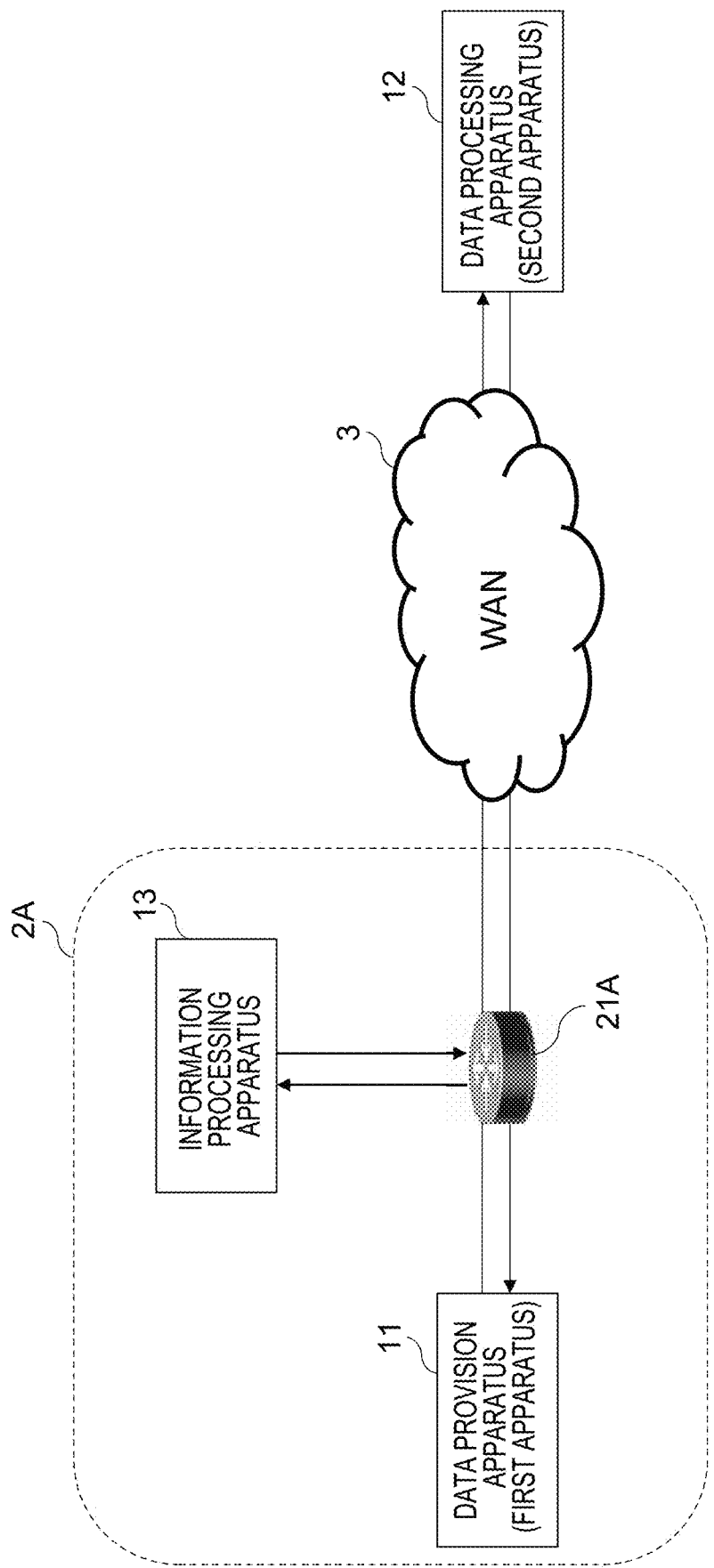
FIG. 6 is a diagram illustrating a first example of an arrangement of an information processing apparatus.

FIG. 6 is a diagram illustrating a first example of an arrangement of the information processing apparatus 13. In a case of the example of FIG. 6, the information processing apparatus 13 and the data provision apparatus 11 are connected to same communication equipment 21A such as a router and exist in a same LAN 2A. In this case, a communication period of the actual communication data is substantially the same as a communication period of the test communication data. Therefore, in this case, the transmitter 135 only have to take care of transmitting the test communication data to the data processing apparatus 12 at the transmission time set in the test communication data.

Figure 7:
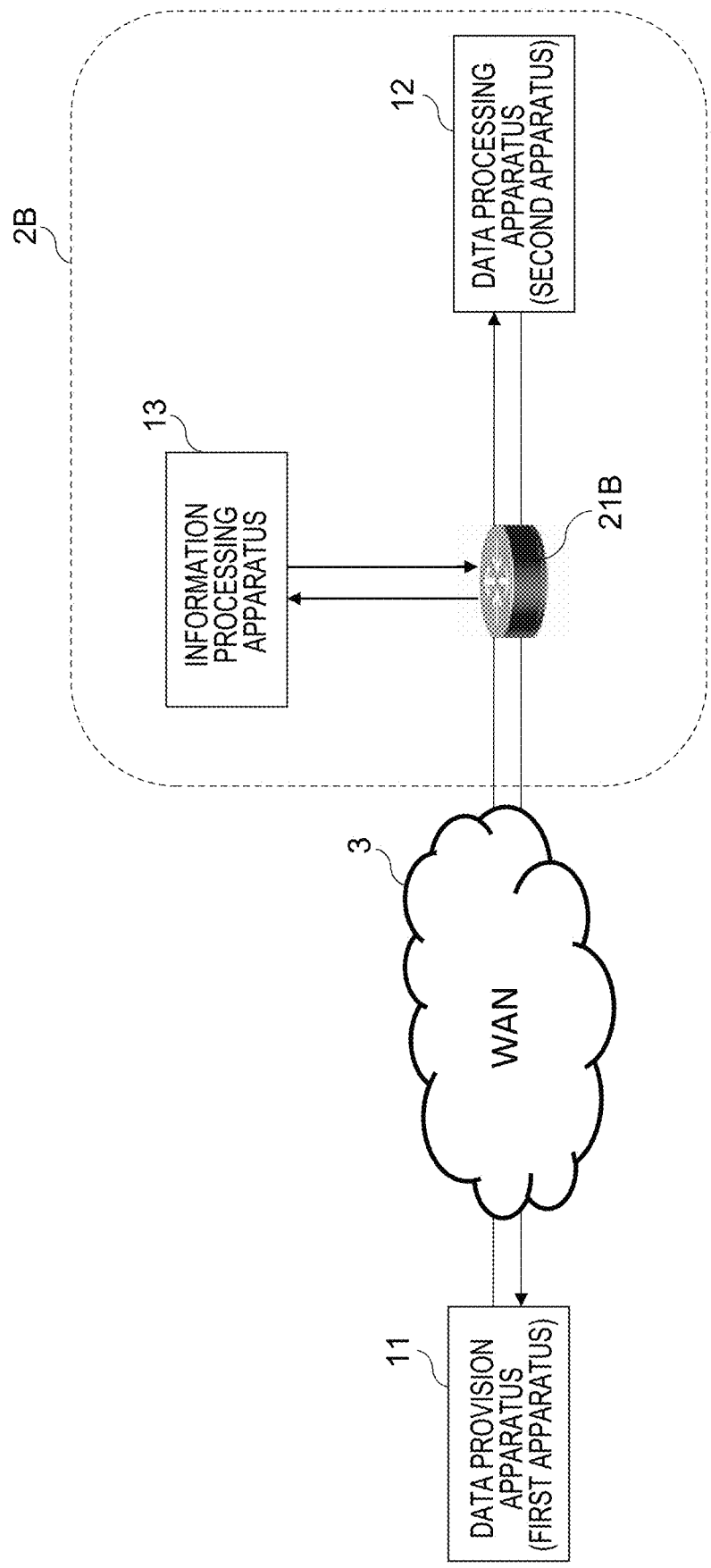
FIG. 7 is a diagram illustrating a second example of the arrangement of the information processing apparatus.

FIG. 7 is a diagram illustrating a second example of the arrangement of the information processing apparatus 13. In a case of the example of FIG. 7, the information processing apparatus 13 and the data processing apparatus 12 are connected to same communication equipment 21B and exist in a same LAN 2B. In this case, it takes a certain period of time for the actual communication data to reach the LAN 2B from the data provision apparatus 11. Therefore, when the transmitter 135 transmits the test communication data to the data processing apparatus 12 at the transmission time set in the test communication data, a difference from an actual communication period is generated to some extent. In view of the above, the transmitter 135 transmits the test communication data at a time after the period of time for the actual communication data to reach the LAN 2B from the data provision apparatus 11 elapses from the transmission time set in the test communication data. With this configuration, the data processing apparatus 12 is set to receive the test communication data at a time at which the data processing apparatus 12 receives the actual communication data when it is assumed that the data provision apparatus 11 transmits the actual communication data at the transmission time set in the test communication data.

It is noted that information related to an installation location of the information processing apparatus 13 may be stored in the storage 133 in advance. Alternatively, the analyzer 132 of the information processing apparatus 13 may determine whether or not the information processing apparatus 13 exists in the identical LAN to that of the data provision apparatus 11 or the data processing apparatus 12 by comparing the IP address of the information processing apparatus 13 with the IP address of the data provision apparatus 11 or the data processing apparatus 12. In addition, when the receiver 131 of the information processing apparatus 13 records the reception time of the actual communication data, and the analyzer 132 calculates the difference from the transmission time of the actual communication data, it is possible to calculate a communication period of time from the data provision apparatus 11 to the information processing apparatus 13. Therefore, the transmission timing can be adjusted using the communication period of time from the data provision apparatus 11 to the information processing apparatus 13. As described above, according to the present embodiment, the test communication data can be automatically created based on the actual communication data transmitted by the data provision apparatus 11. In addition, contents of the test communication data can be a mixture of normal data, semi-normal data, and abnormal data, like the actual communication data. Furthermore, not only the contents of the test communication data but also the transmission interval of the test communication data, a relationship between the reception period of the test communication data by the data processing apparatus 12 and the measurement time included in the test communication data, and the like are approximated to an actual situation, so that it is possible to perform the test with high reproducibility.

It is noted that at least a part of the above-described embodiment may be realized by a dedicated electronic circuit (that is, hardware) such as an integrated circuit (IC) in which a processor, a memory, and the like are implemented. In addition, at least a part of the above-described embodiment may be realized by executing software (program). For example, a computer device for a general purpose is basically used as the hardware, and a processor such as a CPU mounted to the computer device is caused to execute the program, so that it is possible to realize the processing of the above-described embodiment.

For example, when dedicated software stored in a computer-readable storage medium is read out by a computer, the computer can be caused to function as the apparatuses of the above-described embodiment. A type of the storage medium is not particularly limited. In addition, when the computer installs therein the dedicated software downloaded via the communication network, the computer can be caused to function as the apparatuses of the above-described embodiment. In this manner, information processing by the software is explicitly implemented using hardware resources.

Figure 8:
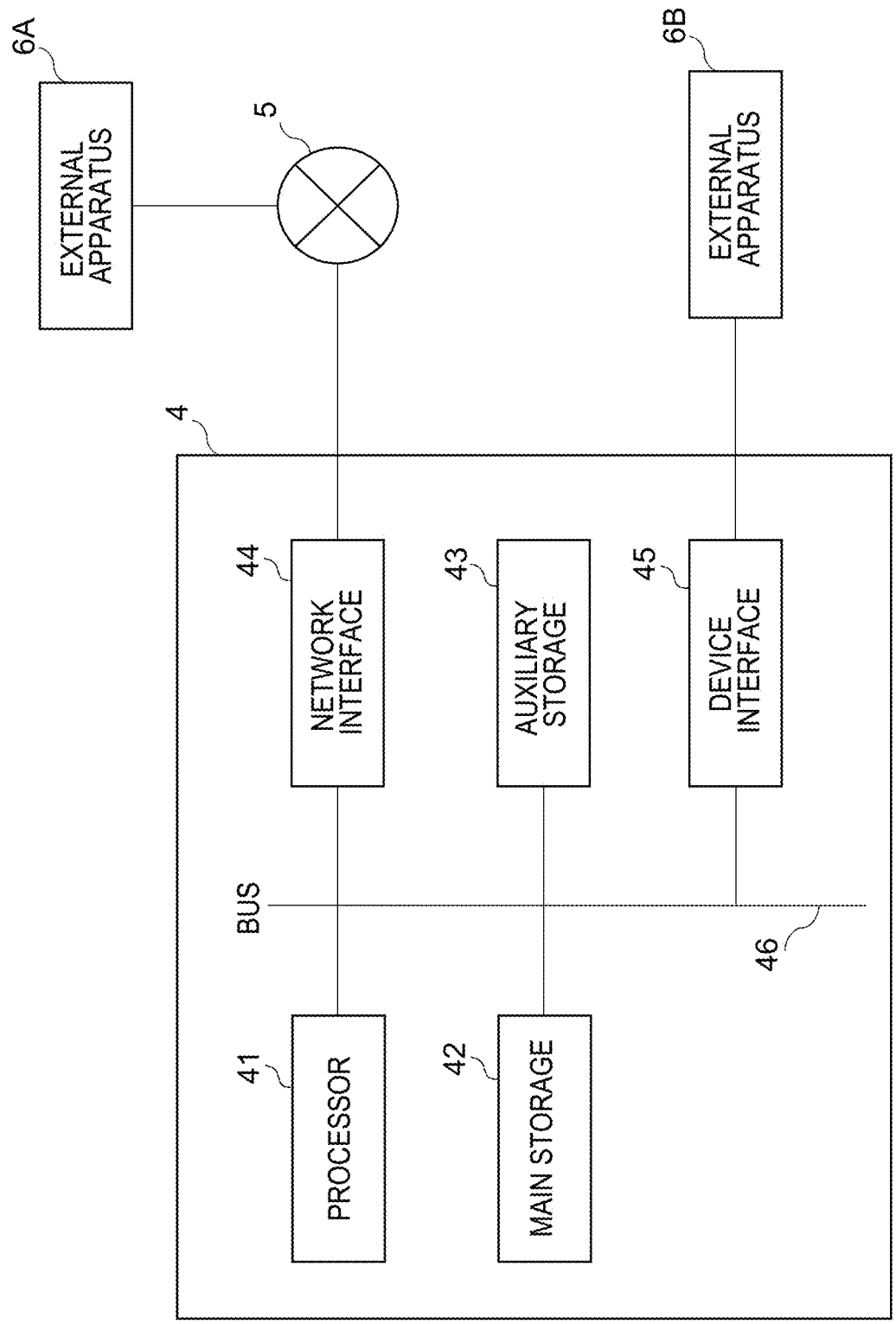
FIG. 8 is a block diagram illustrating one example of a hardware configuration according to one embodiment of the present invention.

FIG. 8 is a block diagram illustrating one example of a hardware configuration according to one embodiment of the present invention. The information processing apparatus 13 includes a processor 41, a main storage 42, an auxiliary storage 43, a network interface 44, and a device interface 45, and can be realized as a computer device 4 in which these components are connected via a bus 46. The storage 133 can be realized by the main storage 42 or the auxiliary storage 43, and other components can be realized by the processor 41.

It is noted that the computer device 4 of FIG. 8 includes one each of the components, but may include plural pieces of the same components. In addition, FIG. 8 illustrates the computer device 4 as a single device, but the software may be installed in a plurality of computer devices, and each of the plurality of computer devices may execute a different part of the processing of the software.

The processor 41 is an electronic circuit including a control device and an arithmetic device of the computer. The processor 41 is configured to perform operation processing based on data or a program input from each of the devices of an internal configuration of the computer device 4 or the like, and output an operation result or a control signal to each of the devices. Specifically, the processor 41 executes an operating system (OS), application, and the like of the computer device 4, and controls each of the devices configuring the computer device 4. The processor 41 is not particularly limited as long as the above-described processing can be performed.

The main storage 42 is a storage that stores instructions executed by the processor 41, various types of data, and the like, and information stored in the main storage 42 is directly read out by the processor 41. The auxiliary storage 43 is a storage other than the main storage 42. It is noted that these storages mean optional electronic parts that can store electronic information, and may be a memory or a storage. In addition, the memory includes a volatile memory and a nonvolatile memory, but any of these memories may be used.

The network interface 44 is an interface configured to establish connection to a communication network 5 in a wireless or wired manner. An interface in conformity to an existing communication protocol may be used as the network interface 44. Information may be exchanged with an external apparatus 6A communicably connected via the communication network 5 through the network interface 44.

The device interface 45 is an interface such as a USB directly connected to an external apparatus 6B. The external apparatus 6B may be an external storage medium or a storage such as a database.

The external apparatuses 6A and 6B may be the simulator 107, an output device, or an input device. The output device may be, for example, a display device configured to display an image, or a device configured to output sound or the like. For example, the output device includes a liquid crystal display (LCD), a cathode ray tube (CRT), a plasma display panel (PDP), a speaker, and the like, but is not limited to them. The input device includes devices such as a keyboard, a mouse, and a touch panel, and is configured to supply information input by these devices to the computer device 4. A signal from the input device is output to the processor 41.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing apparatus comprising:
   a receiver configured to receive data transmitted from a first apparatus and addressed to a second apparatus;
   an analyzer configured to perform an analysis on the data that is received;
   a generator configured to generate test communication data corresponding to the data that is received based on a result of the analysis; and
   a transmitter configured to transmit the test communication data to the second apparatus with a transmission source of the test communication data being as the first apparatus,
   wherein:
      the data that is received includes a transmission time of the data that is received from the first apparatus, data required for processing of the second apparatus, and an obtainment time of the data required for the processing of the second apparatus,
      the analyzer detects the transmission time and the obtainment time from the data that is received, and
      the generator generates the test communication data having a transmission time and an obtainment time that are different from the transmission time and the obtainment time of the data that is received and having a same difference between the transmission time and the obtainment time as a difference between the transmission time and the obtainment time of the data that is received.

2. The information processing apparatus according to claim 1, wherein
   the data that is received includes plural pieces, and the analyzer executes statistical processing on the plural pieces of data that is received,
   the generator generates plural pieces of test communication data based on a result of the statistical processing, and
   between the plural pieces of data that is received and the plural pieces of test communication data, distributions of one or more items set as targets of the statistical processing are matched with each other.

3. The information processing apparatus according to claim 2, wherein
   between the plural pieces of data that is received and the plural pieces of test communication data, distributions of transmission intervals are matched with each other.

4. The information processing apparatus according to claim 2, wherein
   between the plural pieces of data that is received and the plural pieces of test communication data, distributions of values of the data required for the processing of the second apparatus are matched with each other.

5. The information processing apparatus according to claim 2, wherein
   the receiver receives specification data related to the first apparatus or communication from the first apparatus to the second apparatus, and
   the analyzer executes the statistical processing on an item that is not included in the specification data.

6. The information processing apparatus according to claim 2, wherein
   the receiver receives statistical data based on an actual record of communication from the first apparatus to the second apparatus, and
   the analyzer executes the statistical processing on an item that is not included in the statistical data.

7. The information processing apparatus according to claim 1, wherein
   the data that is received includes a transmission time of the data that is received from the first apparatus,
   the receiver records a reception time of the data that is received,
   the analyzer detects the transmission time from the data that is received,
   the generator includes, in the test communication data, a first time at which it is assumed that the first apparatus transmits the test communication data, and
   the transmitter transmits the test communication data to the second apparatus when a time approximately corresponding to a difference between the transmission time and the reception time elapses from the first time.

8. The information processing apparatus according to claim 1, wherein
   the data that is received includes data indicating a communication network to which the first apparatus or the second apparatus belongs,
   the analyzer detects the data indicating the communication network to which the first apparatus or the second apparatus belongs, and determines whether any of the first apparatus and the second apparatus belongs to a same communication network as the information processing apparatus itself,
   the generator includes, in the test communication data, a first time at which it is assumed that the first apparatus transmits the test communication data, and
   the transmitter
      transmits the test communication data to the second apparatus when approximately a first predetermined period of time elapses from the first time in a case where it is determined that the first apparatus belongs to the same communication network as the information processing apparatus itself, and
      transmits the test communication data to the second apparatus when approximately a second predetermined period of time that is longer than the first predetermined period of time elapses from the first time in a case where it is determined that the second apparatus belongs to the same communication network as the information processing apparatus itself.

9. The information processing apparatus according to claim 1, further comprising
   a storage that stores the data that is received, wherein
   the receiver receives a processing result that is a processing result of the second apparatus based on the data and satisfies a predetermined condition, and
   the generator extracts data that brings about the processing result satisfying the predetermined condition from the storage, and generates the test communication data based on the data that is extracted.

10. A non-transitory storage medium storing a program that, when executed by a computer, causes the computer to perform processing comprising:
receiving data transmitted from a first apparatus and addressed to a second apparatus;
performing an analysis on the data that is received;
generating test communication data corresponding to the data that is received based on a result of the analysis; and
transmitting the test communication data to the second apparatus with a transmission source of the test communication data being as the first apparatus,
wherein:
the data that is received includes a transmission time of the data that is received from the first apparatus, data required for processing of the second apparatus, and an obtainment time of the data required for the processing of the second apparatus, and
the processing further comprises:
detecting the transmission time and the obtainment time from the data that is received, and
generating the test communication data having a transmission time and an obtainment time that are different from the transmission time and the obtainment time of the data that is received and having a same difference between the transmission time and the obtainment time as a difference between the transmission time and the obtainment time of the data that is received.

11. An information processing system comprising:
a first apparatus;
a second apparatus configured to receive data required for processing from the first apparatus;
a first information processing apparatus configured to receive data transmitted from the first apparatus and addressed to the second apparatus, and perform an analysis on the data that is received; and
a second information processing apparatus configured to generate test communication data corresponding to the data that is received based on a result of the analysis, and transmit the test communication data to the second apparatus with a transmission source of the test communication data being as the first apparatus,
wherein:
the data that is received includes a transmission time of the data that is received from the first apparatus, data required for processing of the second apparatus, and an obtainment time of the data required for the processing of the second apparatus,
the first information processing apparatus detects the transmission time and the obtainment time from the data that is received, and
the second information processing apparatus generates the test communication data having a transmission time and an obtainment time that are different from the transmission time and the obtainment time of the data that is received and having a same difference between the transmission time and the obtainment time as a difference between the transmission time and the obtainment time of the data that is received.

12. The information processing system according to claim 11, wherein
the first apparatus and the second apparatus belong to different communication segments, and
both the first information processing apparatus and the second information processing apparatus belong to a communication segment to which the first apparatus or the second apparatus belongs.

13. An information processing method comprising:
receiving data transmitted from a first apparatus and addressed to a second apparatus;
performing an analysis on the data that is received;
generating test communication data corresponding to the data that is received based on a result of the analysis; and
transmitting the test communication data to the second apparatus with a transmission source of the test communication data being as the first apparatus,
wherein:
the data that is received includes a transmission time of the data that is received from the first apparatus, data required for processing of the second apparatus, and an obtainment time of the data required for the processing of the second apparatus, and
the processing further comprises
detecting the transmission time and the obtainment time from the data that is received, and
generating the test communication data having a transmission time and an obtainment time that are different from the transmission time and the obtainment time of the data that is received and having a same difference between the transmission time and the obtainment time as a difference between the transmission time and the obtainment time of the data that is received.

* * * * *